United States Patent [19]
Rollender et al.

[11] Patent Number: 5,971,282
[45] Date of Patent: *Oct. 26, 1999

[54] PERSONAL TOKEN CARD WITH SENSOR

[75] Inventors: Matthew Rollender, Gilbert; Michael A. Brown, Phoenix, both of Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/533,735

[22] Filed: Sep. 26, 1995

[51] Int. Cl.⁶ .................................................. G06K 19/06
[52] U.S. Cl. ........................... 235/492; 235/487; 235/395
[58] Field of Search ................................. 235/382, 382.5, 235/491, 492, 493, 380, 349, 487, 375; 370/349

[56] References Cited

U.S. PATENT DOCUMENTS

| | | | |
|---|---|---|---|
| 4,066,910 | 1/1978 | Swift | 235/454 |
| 4,286,465 | 9/1981 | Thomae | 73/342 |
| 4,727,244 | 2/1988 | Nakano et al. | 235/492 X |
| 5,036,461 | 7/1991 | Elliot et al. | 235/380 X |
| 5,131,038 | 7/1992 | Puhl et al. | 235/382 X |
| 5,132,968 | 7/1992 | Cephus | 370/349 |
| 5,153,842 | 10/1992 | Dlugos, Sr. et al. | 235/380 X |
| 5,182,442 | 1/1993 | Takahira | 235/492 |
| 5,200,601 | 4/1993 | Jaris | 235/492 |
| 5,272,477 | 12/1993 | Tashima et al. | 340/870.16 |
| 5,574,465 | 11/1996 | Okada | 342/352 |

*Primary Examiner*—Donald Hajec
*Assistant Examiner*—Karl D. Frech
*Attorney, Agent, or Firm*—Blakely, Sokoloff, Taylor & Zafman LLP

[57] ABSTRACT

The personal token card, which may be configured with the form factor of a Smartcard or of a PCMCIA card, includes at least one sensor for sensing environmental conditions and an output device for outputting signals representative of the environmental conditions. The sensor may sense radiation levels, chemical and biological toxins, temperature or pressure, or other conditions. The output device may generate an alarm, such as an audible or visual alarm, or may simply output recorded environmental data, either electronically or using a radio frequency output. A memory is provided for recording digitized data and a logic element is provided for analyzing recorded data to detect whether predetermined thresholds have been exceeded. A battery power supply is also provided to provide power for the various components. The power supply, as well as many of the other components, may be activated or deactivated in accordance with enablement signals received from an external system. For example, the battery may be activated only when needed, to thereby conserve power.

60 Claims, 5 Drawing Sheets

PERSONAL TOKEN CARD WITH SENSOR

BACKGROUND OF THE INVENTION

1. Field of the Invention

The invention generally relates to personal token cards and to environmental sensor devices.

2. Description of Related Art

Workers are sometimes required to enter environments which may be harmful such as work areas possibly having radiation or biological or chemical toxins. Rudimentary portable sensors have been developed for carrying by workers to detect exposure to certain harmful environments, such as radioactive environments. However, such portable sensors often provide only limited information such as whether the worker is exposed to more than some predetermined level of radiation. No history of exposure is recorded. Moreover, the sensor indication is often not provided in real time. Rather the sensor indication may not be provided until well after the worker has been exposed to the harmful environment. Examples include sensor badges carried by workers in potentially radioactive environments which include a radiation monitor. The radiation monitor includes a radiation sensitive material, much like photographic film, which becomes discolored sometime after the badge, and worker, have been exposed to potentially harmful levels of radiation.

Somewhat more sophisticated portable sensors have also been developed which provide a more prompt indication of potential harm, particularly for use in environments having potential chemical toxins. However, such portable sensors are often rather bulky and inconvenient to carry. As a result of the inconvenience, workers may not carry the portable sensor device thereby forfeiting any advantages otherwise gained by carrying such a device.

In view of the shortcomings of conventional portable sensor devices, it would be desirable to provide an improved portable sensor, particularly of a small and lightweight size, for use by workers, or others, potentially exposed to harmful environments. It is particularly desirable to provide an improved portable sensor with a capability of providing more than a mere indication of overall exposure, but also with the capability of recording the history of exposure and of providing alarms or other indications in real time if exposure exceeds predetermined thresholds.

Turning to a different technology, personal token cards, such as Smartcards, are becoming increasingly popular for recording and storing personal information, such as funds available within debit cards. Smartcard is a trademark of Bull CP8 Transac Corporation. A typical personal token card is about the size of a credit card and includes circuitry for inputting and outputting rudimentary information such as the amount of funds available within a debit card. Examples include telephone debit cards which are preprogrammed with a certain cash value, such as $20.00, for use in operating pay telephones. Such cards include an input/output pad for outputting a current cash value to a external system, such as a pay telephone, and for receiving a new cash value following a transaction. The cash value is stored using a non-volatile memory, such as an EPROM or flash memory. which can only be read or modified by an external system connected to the card.

Many such personal token cards conform to a form factors specified by the International Standards Organization (ISO) and include input/output pad configurations and data transmission protocols also specified by the ISO. One exemplary input/output pad configuration includes pads for power, ground, clock, input/output and reset signals. Data, corresponding for example to the cash value of a debit card, is input and output through the I/O pad using a serial data transmission protocol.

Hence, the typical personal token card merely includes a memory device for storing information recorded by an external system, such as a cash value within a debit card. Some slightly more sophisticated personal token cards have been developed which include some rudimentary logic within an integrated circuit (IC) chip such as a microcontroller chip. Examples include health care authorization cards which store medical records or security access cards which store security access codes, perhaps in an encrypted form, and include a micro-controller chip for handling encryption and de-encryption. Such security access cards may be employed by workers to access security facilities or by members of the public to access personal financial records or the like.

Turning to yet another technology, personal computer memory card international association (PCMCIA) cards are becoming increasingly popular for use with personal computer systems. PCMCIA cards, which have the shape of a credit card but somewhat thicker, often include sophisticated electronics for use in connection with a personal computer. Examples include memory devices such as hard disk drives mounted within the PCMCIA card. The PCMCIA card is inserted into a slot within a personal computer allowing the computer, and application programs running thereon, to utilize the electronics of the PCMCIA card, perhaps to access information stored therein or to otherwise utilize the electronics. Other examples include PCMCIA cards configured to provide audio capability or to interface the computer with external systems such as integrated services data network (ISDN) systems.

The inventors of the invention described herein have recognized that the aforementioned problem of providing improved personal environmental sensors may be solved by configuring a personal token card or a PCMCIA card to include a sensor for sensing environment information, such as radiation exposure, and it is to that end that the present invention is drawn.

SUMMARY OF THE INVENTION

In accordance with the invention, a personal token card is provided with a means for sensing environmental conditions, such as radiation, chemical or biological toxins, temperature or pressure, and a means for outputting signals representative of the environmental conditions, such as an audible alarm, a visual indicator signal, and an electronic output or radio frequency output. By providing a personal token card with an environmental sensor for sensing environmental conditions and an output means for outputting signals representative of those conditions, workers, or others, may be promptly notified of potentially dangerous conditions, such as high radiation levels. The personal token card may be configured with a form factor of a Smartcard or of a PCMCIA card and include input/output pads conforming to standard configurations for transmitting data using standard protocols.

In one embodiment, the personal token card also includes a means for recording signals representative of the environmental conditions as a function of time in digital form. If the sensor means is an analog sensor, an analog-to-digital converter is also provided for converting analog signals output by the sensor means to digital signals for storage by the recording means. Either the recording means or the output means, or both, may be connected to an input means for receiving an enablement signal to allow the output means, or the recording means, or both, to operate only in response to an input enablement signal. For example, the output means may operate only in response to an input signal received from an external system when the personal token card is inserted into a card render device of the external system. Likewise, the recording means may operate to record signals only when triggered by an external system.

Also within the exemplary embodiment, a means for analyzing the recorded signals is provided. The means for analyzing may generate an alarm signal if the recorded information exceeds a predetermined threshold. In alternative embodiments, the means for analyzing may also generate alarm signals if the time rate of change of the recorded signals exceeds a certain threshold or if the integration or sum of the recorded signals, over a period of time, exceeds a predetermined threshold.

Also in the exemplary embodiment, the means for recording may record an indication of the location of the personal token card, within an external system, perhaps to allow a history of the locations, offices or workrooms, entered by a worker to be stored and subsequently downloaded.

The personal token card includes an on-board means for providing power, which may be a battery. The means for providing power provides electrical power for operating the various sensor means, memory means, output means, logic means and the like. As with the memory means and the output means, the means for providing power may be controlled in response to an enablement signal received from an external system to ensure that power is used only when needed.

An encryption means may be provided for encrypting any data signals downloaded from the card, perhaps to ensure the confidentiality of such information. If configured as a Smartcard, the personal token card is preferably flexible and includes interconnection circuitry, interconnecting the various means, configured using polyamide circuit technology or similar flexible circuit technology.

With the foregoing features, the personal token card of the invention provides a powerful tool for sensing potentially adverse environmental conditions and for warning a worker, or other person, carrying the card of the adverse conditions, either immediately or subsequent to some analysis of recorded environmental data. Hence, the personal token card provides much more information than is available with conventional portable sensors, without requiring a bulky sensor device. Indeed, the personal token card of the invention may be configured as a security badge, or similar, that a worker may clip to his or her clothing or otherwise easily carry. Hence, the problems with conventional portable sensors summarized above are substantially overcome. Other features and advantages of the invention will be apparent from the drawings attached hereto and from the detailed description of the invention which follows.

DETAILED DESCRIPTION OF EXEMPLARY EMBODIMENTS OF THE INVENTION

Referring to the figures, exemplary embodiments of the invention will now be described. The exemplary embodiments are primarily described with reference to block diagrams illustrating primary components of the personal token card configured in accordance with the invention. In most cases, the detailed configuration of components illustrated in the block diagrams will not be set forth as these components are either entirely conventional or are based on conventional components which can be easily modified, in accordance with the teachings provided herein, by those of ordinary skill in the art. Also, it would be understood that some components of a practical system incorporating the invention, which are not necessary for an understanding of the invention, are not illustrated and will not be described. Also, herein, the apparatus element corresponding to each individual block may be referred to as a means for, an element for or a unit for performing the functions described in connection with the block.

Figure 1:
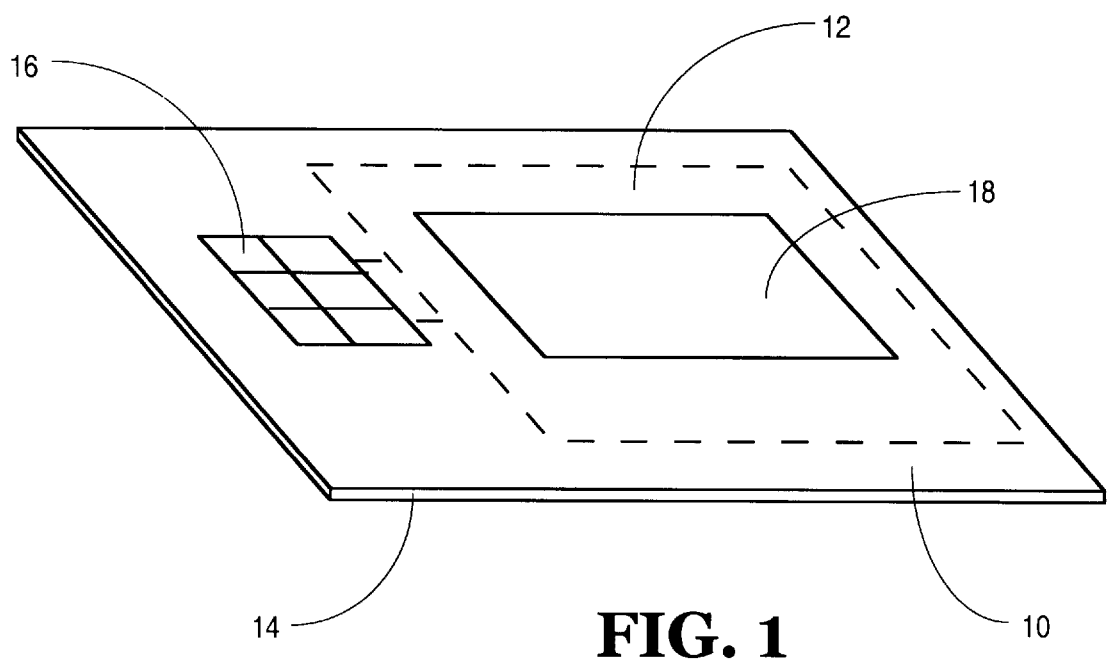
FIG. 1 is a perspective view of a personal token card configured in accordance with a first exemplary embodiment of the invention, wherein the card conforms to ISO Smartcard form factor and protocol constraints.

FIG. 1 is a perspective view of a personal token card 10 sized to conform with the form factor specified by the ISO for a Smartcard. Token card 10 includes an environmental sensor and related circuitry 12, illustrated in phantom lines, embedded within a plastic body 14 of the card. In one embodiment, the sensor and electronics is sealed between a pair of plastic members forming top and bottom surfaces of the card. The sensor records environmental stimulus or other information, such as radiation levels, temperature or pressure, or the presence of biological or chemical toxins. An input/output pad 16, which may also conform to ISO standards, is provided for receiving control signals and for outputting data. In one embodiment, the input/output pad includes six I/O pads for power, ground, clock, input/output and reset signals. Control signals are input to, and data is output from, the card through the I/O pad 16 when placed in contact with corresponding pads of an external system (not shown).

Card 10 may be also employed as a security badge or security card and may include appropriate security indicia, such as a photograph 18, on one of the side surfaces of the card.

Internal components and functions of the card will now be described with reference to FIG. 2. Card 10 includes, as its principle components, a environmental sensor 20 for generating analog signals, an analog-to-digital converter 22 for converting the analog signals to digitized data, a memory 24 for storing the digitized data, and an output element 26, which may be connected to output pad 16 of FIG. 1, for outputting digitized data. The card also includes a battery 28, or other power supply element, an alarm 30, which may include an audible indicator or a visual indicator, a logic element 28 for analyzing data stored within the recording memory element 24, an encryption element 32 for encrypting data prior to output, perhaps to ensure confidentiality and a control unit 34.

In use, the sensor detects environmental stimulus or conditions such as temperature, pressure, radioactivity, or presence of biological or chemical toxins. In embodiment of FIG. 2, only a single sensor is provided capable of detecting only a single type of environmental stimulus. However, in other implementations, such as the one illustrated in FIG. 4, two or more sensors are provided, each capable of sensing or detecting different environmental stimulus. Sensor 20 generates analog signals in response to the detected stimulus and outputs the signals to A/D converter 22 which digitizes the signals for storage in memory 24. Memory 24 may be a conventional RAM device, perhaps configured as a first in/first out (FIFO) buffer for storing only the most recently detected digitized data. In other embodiments, an analog storage device may be employed such that no A/D converter is required.

Logic unit 28 analyzes data stored within memory 24 to detect whether the recorded data matches or exceeds certain predetermined thresholds. For example, if the sensor is a radioactivity sensor, logic unit 28 may examine the recorded radiation levels to determine whether the radiation has exceeded a certain predetermined level. The particular analysis to be performed on the recorded data may depend upon the type of sensor employed and upon the type of data to be stored. For example, if the sensor is a pressure sensor, perhaps for use in scuba diving, the logic unit may be configured to determine the time rate of change of pressure to determine whether it exceeds a certain predetermined threshold. In other cases, the logic unit may integrate or sum the recorded data over a period of time to determine whether the total exceeds some predetermined threshold.

In any case, if the logic unit determines that the recorded data has matched or exceeded some threshold condition, the logic unit controls alarm unit 30, via control unit 34, to generate an alarm warning the person carrying the personal token card 10 of the potentially dangerous conditions. As noted, alarm unit 30 may provide an audible alarm or a visual indication. For an audible alarm, the alarm unit may include an audio transducer, perhaps configured as a piezo-electric element. If configured to provide a visual indicator, the alarm unit may include an LED, LCD, or similar optical device. Also, depending upon the implementation, token card 10 may include a radio frequency (RF) 35 output unit for transmitting a warning signal to an external system.

As noted, digitized data may be output from a system by an output device 26 which includes the set of I/O pads for use in downloading data directly to an external system into which the personal token card is inserted. Alternatively, RF output unit 25 may be used for downloading data remotely. For applications where the confidentiality of the data is required, the data may be passed through encryption unit 32 which encrypts the data prior to downloading.

Each of the aforementioned devices operates from electrical power generated by power supply 28 which may be a battery, such as a nonrechargeable lithium battery cell. Power supply 28 is connected to each of the other components. For clarity, the various interconnection lines are not shown.

Figure 2:
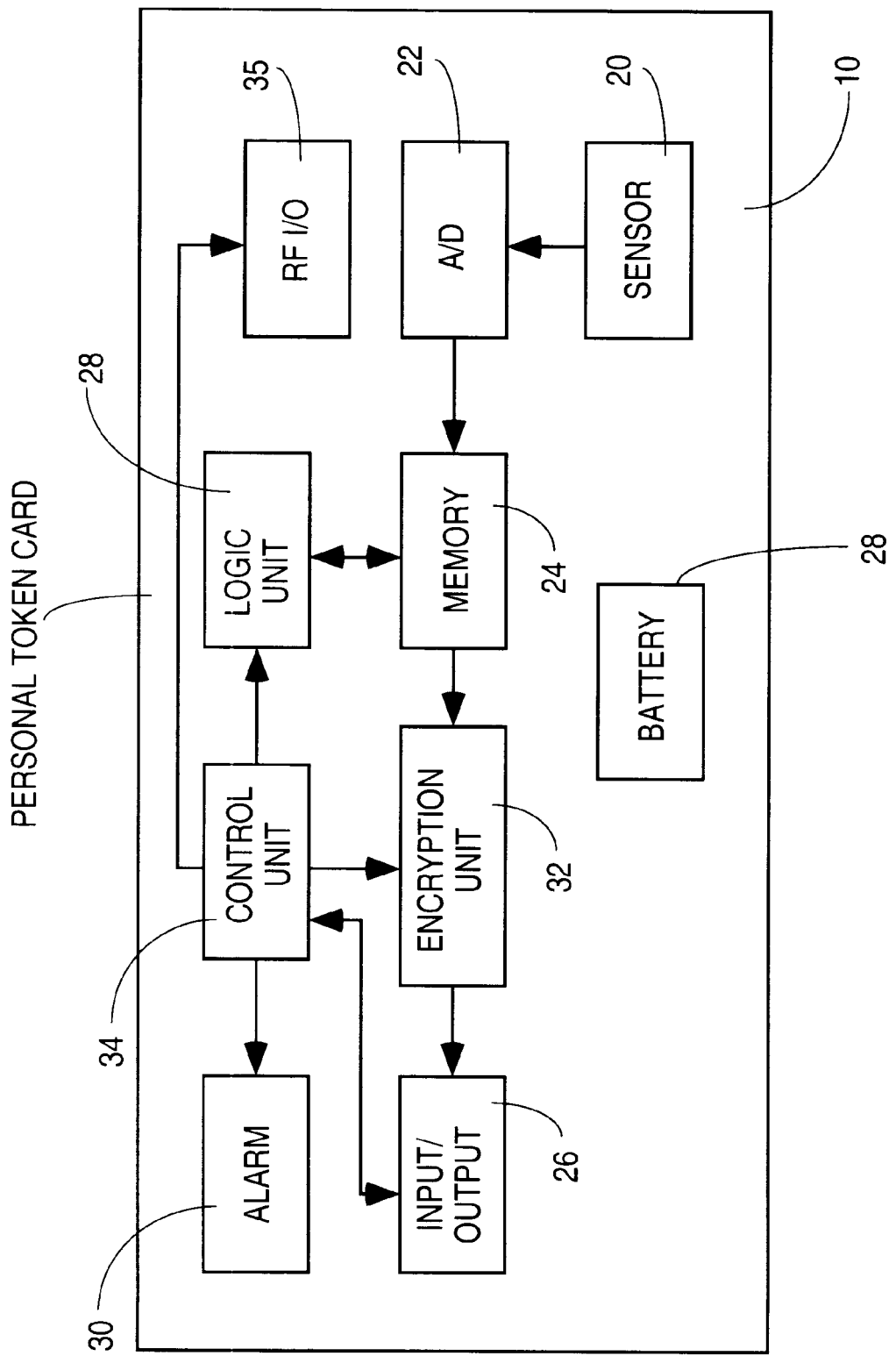
FIG. 2 is a block diagram illustrating the personal token card of FIG. 1.

Also with regards to FIG. 2, a control element 34 is provided for controlling the operation of the various other components, perhaps in response to control signals received through input/output unit 36. For example, the control unit may be configured to activate the sensor only in certain circumstances, such as when the token card is taken into certain workrooms, as determined by signals received through the I/O unit. Also, the control unit may be configured to activate or deactivate the battery in response to enablement signals, to thereby conserve battery power. In other applications, the control unit may control the logic unit to perform different forms of analysis on the recorded data depending upon the reception of enablement or selection signals. For example, in some circumstances, the logic unit may be controlled to analyze the time rate of change of digitized data and in other circumstances the logic unit may be controlled to integrate the recorded data.

As noted, personal token card 10 may be configured using a plastic, flexible body. If flexible, at least a portion of circuitry employed within the various units is configured using polyamide, or similar, technology to ensure that the circuitry is not damaged if the card is bent.

Also as noted, output unit 26 may be connected to external I/O pads configured in accordance with ISO standards for transmitting data in serial to an external system. However, depending upon the amount of data to be transmitted, it may be preferable to implement a more sophisticated I/O system to allow data to be downloaded in parallel and one of a variety of suitable input/output devices and I/O protocols may be employed.

Thus, FIGS. 1 and 2 illustrate a personal token card configured with the form factor of a Smartcard having a sensor for detecting environmental stimulus and a power supply for operating the sensor and various internal components.

Figure 3:
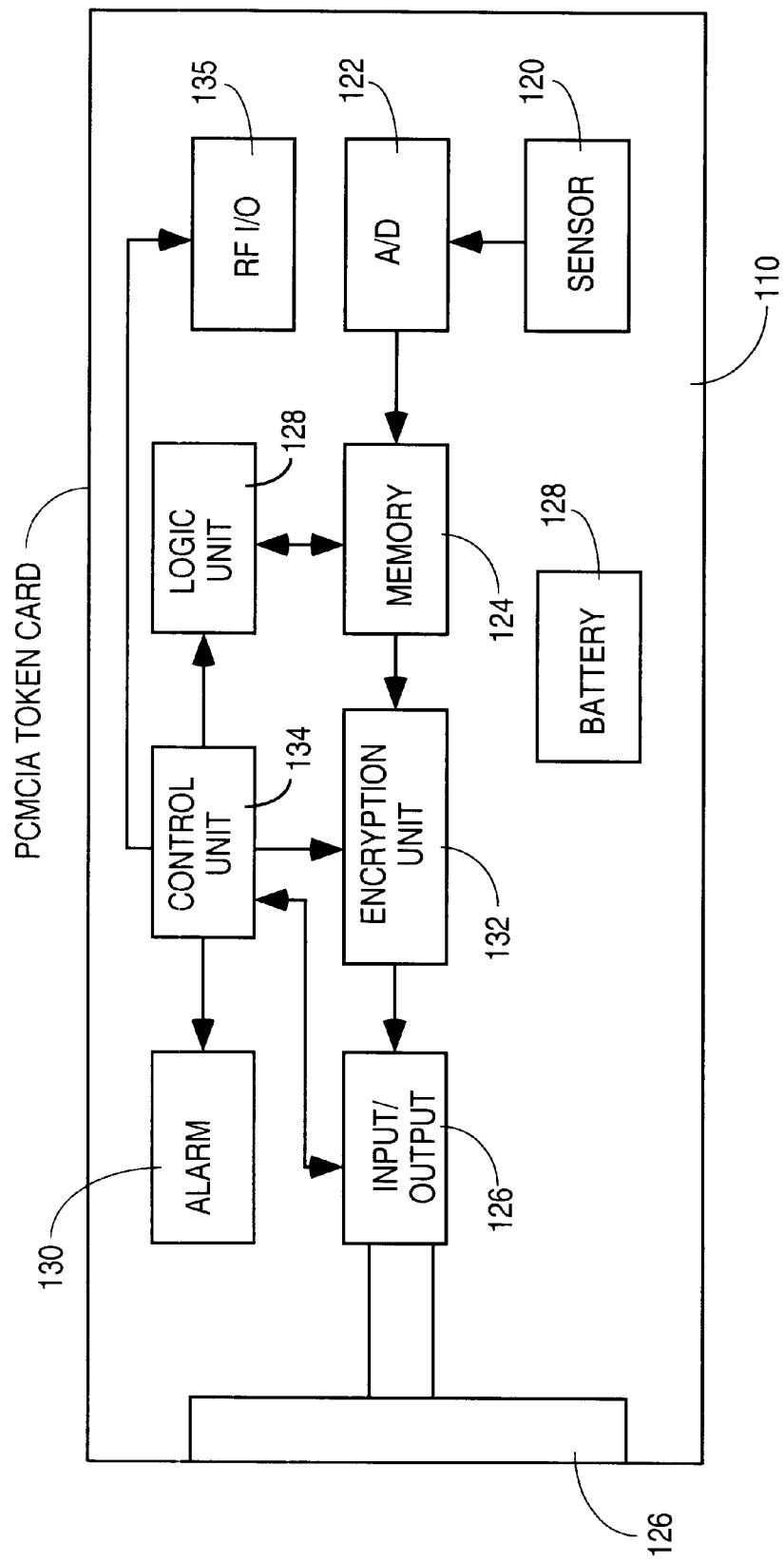
FIG. 3 is a block diagram of a personal token card configured in accordance with a second exemplary embodiment of the invention, wherein the card conforms to PCMCIA form factor and protocol constraints.

FIG. 3 illustrates an alternative embodiment wherein the personal token card of the invention is configured with the form factor of a PCMCIA card for use in connection with an external system adapted to receive a PCMCIA card. The personal token card of FIG. 3 includes most or all of the internal components as that of FIGS. 1 and 2 and those components will not be further described. Like reference or numerals, incremented by a hundred, are employed to identify like components. However, whereas the token card of FIGS. 1 and 2 includes an input/output pad mounted to a side surface of the card, PCMCIA card 110 includes a PCMCIA input/output element 126 mounted to an end of the card or interfacing with an external PCMCIA system. As with the token card of FIGS. 1 and 2, the token card of FIG. 3 includes a sensor for sensing environmental stimulus and various components for recording data, analyzing data, and generating output signals or alarm signals. However, data recorded by token card 110 may be downloaded into a personal computer (not shown) configured to receive PCMCIA cards. An advantage of the configuration of FIG. 3 is that the form factor for PCMCIA cards allows the card to be considerably thicker than ISO form factor Smartcards thereby allowing more space for electrical components such as the sensor, the memory and the like. As such, more sophisticated electrical components may be employed, such as a memory capable of storing greater amounts of data, or generally less expensive components may be employed.

In any case, the PCMCIA card of FIG. 3 is employed in much the same manner as the card of FIGS. 1 and 2. A user, such as worker, carries a card with himself or herself. The card senses environmental stimulus, such as radiation levels, and generates the visual or audible alarm upon the detection of potentially dangerous conditions. A history of the environmental stimulus is recorded within the memory and that history is downloaded either directly through the PCMCIA input/output device or through an RF input/output device within the card.

Figure 4:
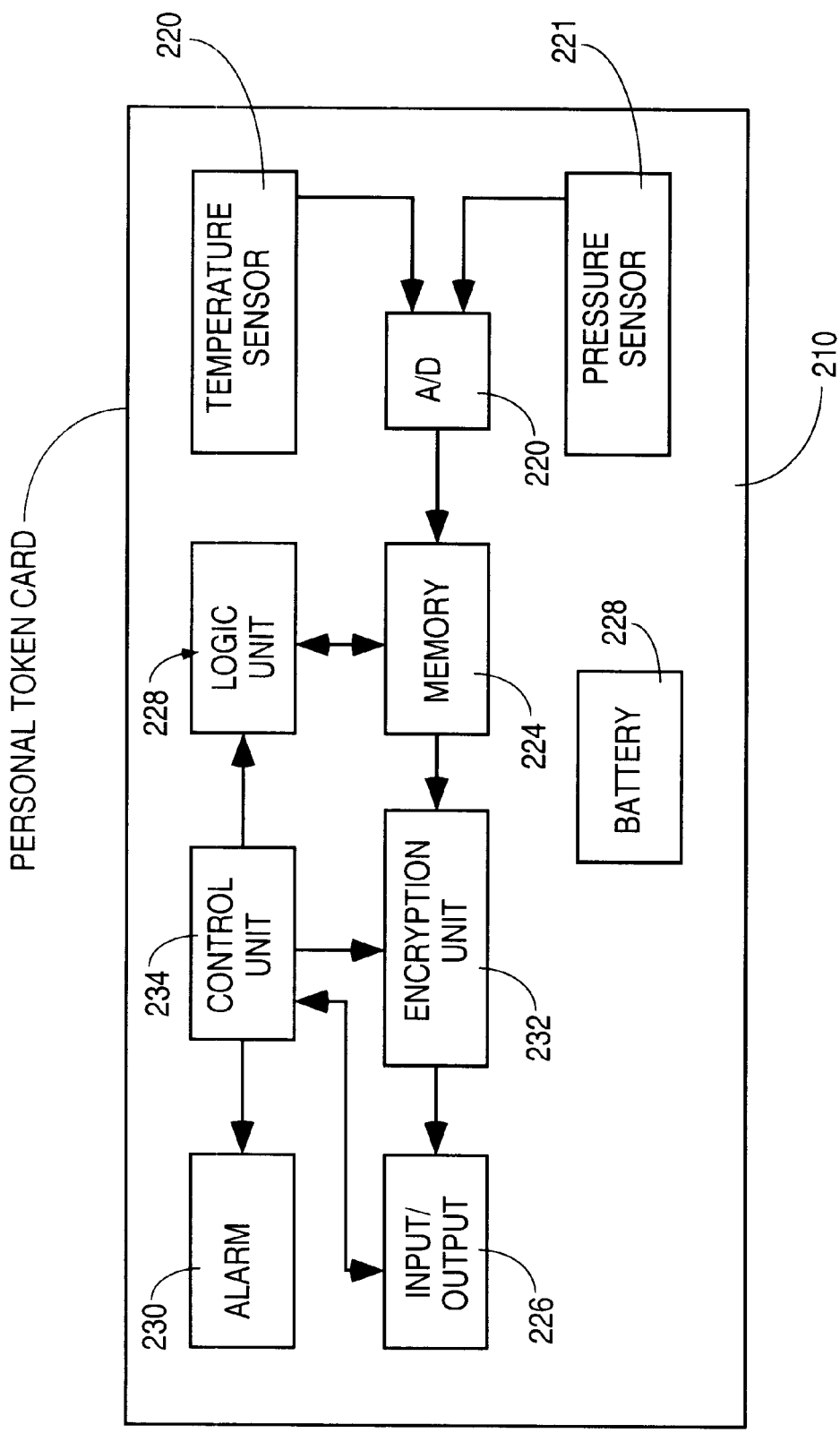
FIG. 4 is a block diagram of an alternative embodiment of the personal token card of FIG. 1 provided with two or more sensors.

FIG. 4 illustrates an alternative embodiment of the personal token card of FIG. 2, provided with at least two sensors. Again, like elements are represented by like reference numerals, but incremented by 200, over those of FIG.

2. More specifically, a pair of different sensors 220 and 221 are provided. Sensor 220 may be a temperature sensor whereas sensor 221 may be a pressure sensor. Control unit 234 controls operation of the two sensors. In some circumstances, sensor 220 is activated and sensor 221 is deactivated. In other circumstances, sensor 221 is activated and sensor 220 is deactivated. In still other circumstances, both sensors may be active simultaneously. If both sensors are operating, digitized data corresponding to one of the sensors may be stored in a first portion of memory element 224 whereas data from the other sensor is stored in a second portion of memory element 224. Control unit 234 controls logic units 228 to perform analysis appropriate for the type of data recorded. Furthermore, the control unit may trigger different forms of alarms when predetermined conditions are detected, depending upon the type of data recorded. For example, the control unit may control alarm 230 to provide a first type of audible alarm if the pressure becomes too high and a second type of audible alarm if the temperature becomes too high. As can be appreciated, an entire set of different sensors may be mounted within the same card, particularly if configured as a PCMCIA card, and a fairly complex control unit may be employed to control operation of the various components of the card based upon the type or types of environmental data being sensed and recorded.

Figure 5:
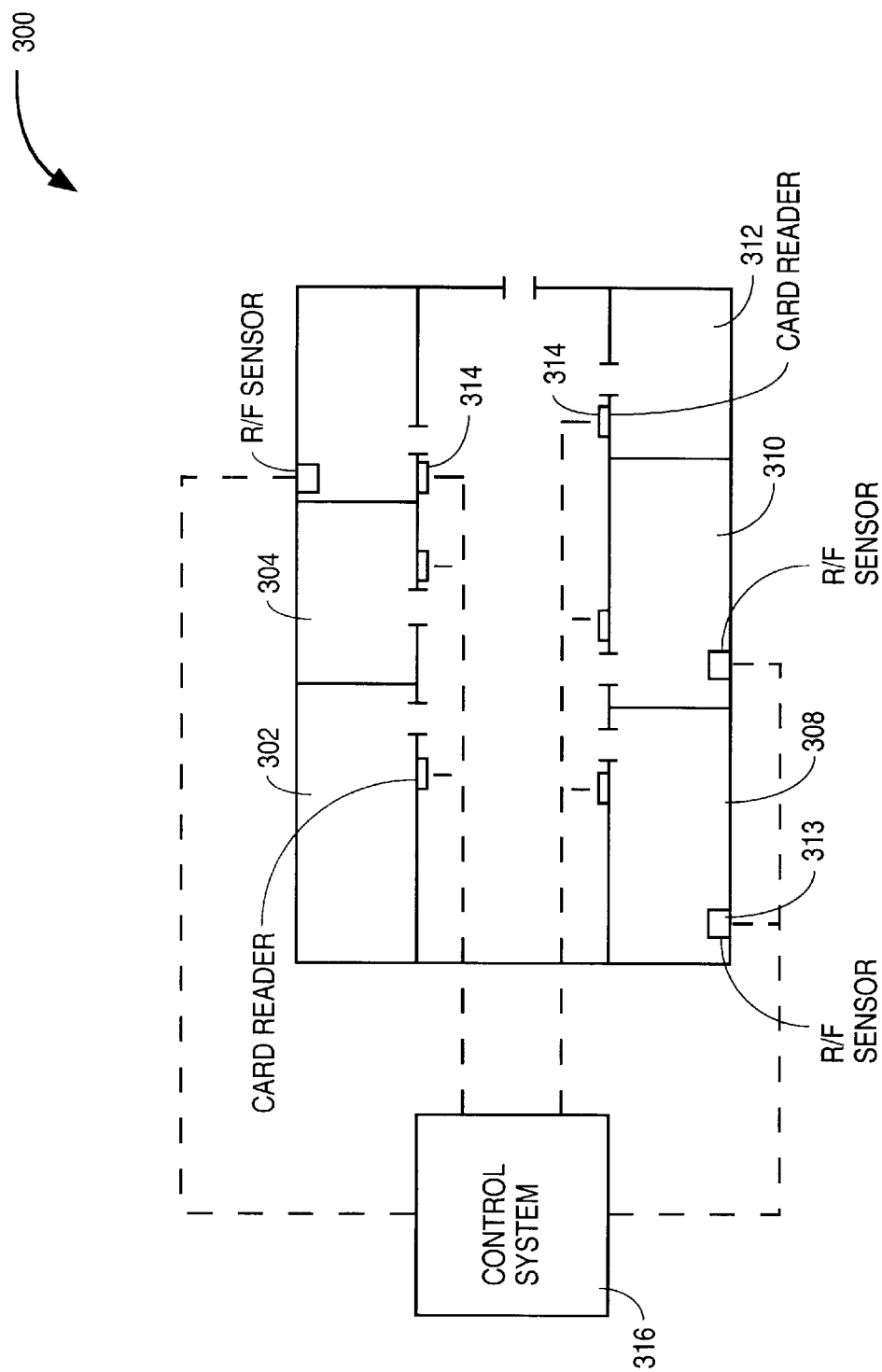
FIG. 5 is a schematic representation of a work environment having a system for controlling and accessing the personal token card of the invention.

The use of a personal token card of the invention in connection with an external system will now be described with reference to FIG. 5. FIG. 5 illustrates a top view of a work environment 30 including a set of separate workrooms 302, 304, 306, 308, 310 and 312. Some of the workrooms may be entirely safe whereas others are potentially harmful environments. For example, workrooms 302 and 304 may be entirely safe, whereas workroom 306 has potential radioactivity, workroom 308 has potential chemical toxins and workroom 310 has potential biological toxins. Workroom 712 may also be safe but may be restricted area for which not all workers are granted access.

Prior to entering any particular room, a worker carrying a personal token card of the invention inserts that card into a card reader device 314 positioned near an entrance to the room. Each of the card readers are connected to a central control system 316. The central control system may control access to the rooms, through automatic doors, not separately shown, depending upon the authorization level of the worker. In this regard, the memory unit of the personal token card may store personal identification information, such as the identity of the worker, his authorization level, etc. Assuming that the worker is entitled to access the particular room, the system then transmits control signals into the personal token card based upon the environment to be entered. For example, if the environment is potentially dangerous, the control system transmits control signals activating the battery of the personal token card and the radiation sensor, if any. If the environment has potential chemical toxins, the control system transmits signals activating the battery and activating the chemical sensor. For those workrooms that are entirely benign, the control system transmits signals deactivating the battery, if necessary, to conserve power. In other implementations, the control system may send signals activating particular logic functions to be performed by the logic system. For example, within one workroom, the logic unit may merely examine maximum levels of environmental stimulus then generate an alarm signal, in other workrooms, the logic unit may be controlled to integrate or sum the recorded data.

Hence, the personal token card is controlled, in accordance with the location of the worker within the overall work environment, by the control system to obtain and record appropriate data within each location. The control system also records the history of the various locations accessed by the particular use, perhaps for use in correlating information regarding the overall health of the work force with locations accessed by the members of work force. For example, if a portion of the work force is becoming ill, the central system may analyze the location histories of each of the ill workers to correlates the locations accessed. As can be appreciated, a wide range of types of data may be monitored and recorded by the overall system and a wide range of specific analysis techniques may be applied to the data.

FIG. 5 also illustrates RF receivers or sensors 313 within each of the potentially dangerous workrooms for receiving an RF alarm signal from personal token cards carried therein. Hence, if any particular personal token card detects that biological or chemical toxins are present or that radioactive level is too high, the personal token card transmits an RF signal which is received by the RF receiver for that workroom. A signal is immediately transmitted to the control system which notifies appropriate personnel and perhaps triggers a separate alarm system, i.e., an external alarm system in addition to the visual or audible alarm provided within the individual personal token card.

What has been described is a personal token card configured with one or more environmental sensors, and various other components, for detecting and recording environmental stimulus and for generating appropriate alarm signals if the environmental stimulus is determined to exceed some predetermined condition. The personal token card of the invention includes a number of individual components described above. In some cases, each individual component may be configured using separate hardwired circuitry. However, where appropriate, the hardware components may be configured using programmable logic devices such as ROMs, EPROMs or flash memory devices. In still other cases, two or more components may be performed by a single hardware component. Indeed, in some implementations all or most components may be implemented with appropriate software within a single microprocessor or micro-controller. Specific embodiments described herein are merely illustrative of principles and should not be construed as limiting the scope of the invention.

What is claimed is:

1. In a personal token card, an improvement comprising:
   providing a personal token card having a sensor for detecting environmental information unrelated to directly detecting radiation levels and temperature;
   providing means for controlling said sensor in response to a predetermined condition external to said card; and
   providing means for outputting a signal representative of said environmental information.

2. A personal token card comprising:
   a card body;
   sensor means for detecting environmental information unrelated to directly detecting radiation levels and temperature:
   control means for activating said sensor means in response to a first predetermined condition external to said card body; and
   means for analyzing recorded environmental information to detect a second predetermined condition; and
   means for outputting a signal representative of said environmental information.

3. The personal token card of claim 2 wherein the means for outputting includes an audio transducer means for generating an audible signal.

4. The personal token card of claim 2 wherein the means for outputting includes a visual indication means for generating a visual signal.

5. The personal token card of claim 2 wherein the means for outputting includes a radio frequency transducer means for outputting a radio frequency signal.

6. The personal token card of claim 2 wherein the means for outputting includes electrical output means for outputting electrical signals.

7. The personal token card of claim 6 wherein the electrical output means comprises an electrical connection pad having a plurality of electrical contacts for coupling with an external electrical input output device.

8. The personal token card of claim 2 further including:
means for inputting an enablement signal; and
wherein said means for outputting is configured to operate in response to said enablement signal.

9. The personal token card of claim 2 wherein the sensor means includes a sensor selected from the group consisting of an electromagnetic sensor, a radiation sensor, a chemical sensor, a temperature sensor, a pressure sensor and a biological sensor.

10. The personal token card of claim 2, wherein said outputting means includes an alarm signal where said analyzing means detects said second predetermined condition.

11. The personal token card of claim 2 further including:
means for receiving an enablement signal; and
wherein said means for recording is configured to operate in response to a received enablement signal.

12. The personal token card of claim 2 further including:
means for analyzing recorded data to detect predetermined condition; and
wherein said means for outputting a signal is configured to operate in response to conditions detected by said means for analyzing.

13. The personal token card of claim 12 wherein the means for analyzing includes means for integrating recorded environmental data.

14. The personal token card of claim 12 wherein the means for analyzing includes means for detecting whether said recorded environmental data exceeds a predetermined threshold.

15. The personal token card of claim 12 wherein the means for analyzing includes means for determining whether a time rate of change of the recorded environmental data exceeds a predetermined threshold.

16. The improvement of claim 2 wherein the means for recording records information identifying the location of the personal token card as determined from input signals received from the external system.

17. The personal token card of claim 2 wherein the means for recording employs non-volatile memory.

18. The personal token card of claim 2 further including:
means for generating power.

19. The personal token card of claim 18 wherein the means for generating power is a battery.

20. The personal token card of claim 18 further including:
means for receiving an enablement signal; and
wherein the means for providing power is configured to operate in response to the enablement signal.

21. The personal token card of claim 2 further comprising:
a circuit for interconnecting the sensor means and the output means, wherein said circuit is a flexible circuit formed from a polyamide substrate coated with a metal.

22. The personal token card of claim 2 wherein the token card is configured with the form factor of an integrated circuit card.

23. The personal token card of claim 2 wherein the card is configured as a security card and has security indicia imprinted on external side surfaces.

24. The personal token card of claim 2 wherein the personal token card is configured with the form factor of a PCMCIA card.

25. The personal token card of claim 24 wherein the means for outputting is configured to interface with PCMCIA-receiving systems.

26. The personal token card of claim 2 wherein the means for outputting includes encryption means for encrypting output environmental data signals.

27. The personal token card of claim 2 wherein the means for outputting outputs signals as a function of time.

28. The personal token card of claim 2 wherein the sensor means is an analog sensor outputting an analog signal; and
wherein the card further includes an analog-to-digital converter for converting said analog signals output from the sensor means to digital signals.

29. The personal token card of claim 2 further including at least one additional sensor for detecting at least one additional type of environmental information.

30. The personal token card of claim 29 further including means for receiving a selection signal; and
wherein said sensor and said at least one additional sensor are configured to operate alternately upon reception of a selection signal.

31. A personal token card comprising:
a card body including;
a sensor for detecting environmental information unrelated to directly detecting radiation levels and temperature;
a control unit for activating said sensor in response to a first predetermined condition external to said card body; and
a logic unit for analyzing recorded data to detect a second predetermined condition; and
an output device for outputting a signal representative of said environmental information.

32. The personal token card of claim 31 wherein the output device includes an audio transducer for generating an audible signal.

33. The personal token card of claim 31 wherein the output device includes a visual indicator alarm for generating a visual signal.

34. The personal token card of claim 31 wherein the output device includes a radio frequency transducer for outputting a radio frequency signal.

35. The personal token card of claim 31 wherein the output device includes an electrical output device for outputting electrical signals.

36. The personal token card of claim 35 wherein the electrical output device comprises an electrical connection pad having a plurality of electrical contacts for coupling with an external electrical input output device.

37. The personal token card of claim 31 further including:
an input device for inputting an enablement signal; and
wherein said for output device is configured to operate in response to said enablement signal.

38. The personal token card of claim 31 wherein the sensor includes a sensor selected from the group consisting of an electromagnetic sensor, a radiation sensor, a chemical sensor, a temperature sensor, a pressure sensor and a biological sensor.

39. The personal token card of claim 31 further including:
an input device for receiving an enablement signal; and wherein said memory is configured to operate in response to a received enablement signal.

40. The personal token card of claim 31 further including:

a logic unit for analyzing recorded data to detect predetermined condition; and wherein said output device is configured to operate in response to conditions detected by said means for analyzing.

41. The personal token card of claim 40 wherein the logic unit includes circuitry for integrating recorded environmental data.

42. The personal token card of claim 40 wherein the logic unit includes circuitry for detecting whether said recorded environmental data exceeds a predetermined threshold.

43. The personal token card of claim 40 wherein the logic unit includes circuitry for determining whether a time rate of change of the recorded environmental data exceeds a predetermined threshold.

44. The personal token card of claim 31 wherein the memory records information identifying the location of the personal token card as determined from input signals received from the external system.

45. The personal token card of claim 31 wherein the memory includes non-volatile memory.

46. The personal token card of claim 31 further including:

a power source.

47. The personal token card of claim 46 wherein the power source is a battery.

48. The personal token card of claim 46 further including:

an input device for receiving an enablement signal; and wherein the power source is configured to operate in response to the enablement signal.

49. The personal token card of claim 31 further comprising:

a circuit for interconnecting the sensor and the output device, wherein said circuit is a flexible circuit formed from a polyamide substrate coated with a metal.

50. The personal token card of claim 31 wherein the token card is configured with the form factor of an integrated circuit card.

51. The personal token card of claim 31 wherein the card is configured as a security card and has security indicia imprinted on external side surfaces.

52. The personal token card of claim 31 wherein the personal token card is configured with the form factor of a PCMCIA card.

53. The personal token card of claim 52 wherein the output device is configured to interface with PCMCIA-receiving systems.

54. The personal token card of claim 31 further including an encryption unit for encrypting output environmental data signals.

55. The personal token card of claim 31 wherein the output device outputs signals as a function of time.

56. The personal token card of claim 31 wherein the sensor is an analog sensor outputting an analog signal; and wherein the card further includes an analog-to-digital converter for converting said analog signals output from the sensor means to digital signals.

57. The personal token card of claim 31 further including at least one additional sensor for detecting at least one additional type of environmental information.

58. The personal token card of claim 57 further including an input device for receiving a selection signal; and wherein said sensor and said at least one additional sensor are configured to operate alternately upon reception of a selection signal.

59. The personal token card of claim 31, wherein the output device comprises an alarm signal where said logic unit detects said second predetermined condition.

60. A personal token card performing the steps of:

providing a personal token card body;

detecting environmental information unrelated to directly detecting radiation levels and temperature by said personal token card in response to a first predetermined condition unrelated to said environmental information;

recording said environmental information within said personal token card;

analyzing recorded environmental information to detect a second predetermined condition; and outputting a signal from said personal token card, said signal representative of said environmental information.

* * * * *